US008009929B2

(12) United States Patent
Sakurai (10) Patent No.: US 8,009,929 B2
(45) Date of Patent: Aug. 30, 2011

(54) IMAGE-CAPTURING APPARATUS, METHOD, AND PROGRAM WHICH CORRECT DISTORTION OF A CAPTURED IMAGE BASED ON AN ANGLE FORMED BETWEEN A DIRECTION OF AN IMAGE-CAPTURING APPARATUS AND A GRAVITATIONAL DIRECTION

(75) Inventor: Keiichi Sakurai, Akishima (JP)

(73) Assignee: Casio Computer Co., Ltd., Tokyo (JP)

( * ) Notice: Subject to any disclaimer, the term of this patent is extended or adjusted under 35 U.S.C. 154(b) by 949 days.

(21) Appl. No.: 11/492,551

(22) Filed: Jul. 25, 2006

(65) Prior Publication Data

US 2007/0070207 A1    Mar. 29, 2007

(30) Foreign Application Priority Data

Aug. 4, 2005    (JP) ................. 2005-226708

(51) Int. Cl.
*G06K 9/36* (2006.01)
*G03B 21/14* (2006.01)
*G03B 41/02* (2006.01)
*G02B 13/08* (2006.01)
*H04N 5/228* (2006.01)

(52) U.S. Cl. .......... 382/286; 353/70; 352/105; 359/668; 348/208.2

(58) Field of Classification Search ............. 382/286
See application file for complete search history.

(56) References Cited

U.S. PATENT DOCUMENTS

| 7,542,087 B2 * | 6/2009 | Raynor | 348/332 |
| 2004/0212699 A1 * | 10/2004 | Molgaard | 348/231.99 |
| 2005/0078192 A1 * | 4/2005 | Sakurai et al. | 348/207.99 |

FOREIGN PATENT DOCUMENTS

| JP | 11-96346 A | 4/1999 |
| JP | 2002-335438 A | 11/2002 |
| JP | 2002-354331 A | 12/2002 |
| JP | 2005-115711 A | 4/2005 |
| JP | 2005-122327 A | 5/2005 |

OTHER PUBLICATIONS

Japanese Office Action dated Mar. 9, 2010 and English translation thereof issued in counterpart Japanese Application No. 2005-226708.

* cited by examiner

*Primary Examiner* — Anand Bhatnagar
*Assistant Examiner* — Randolph Chu
(74) *Attorney, Agent, or Firm* — Holtz, Holtz, Goodman & Chick, PC

(57) ABSTRACT

A digital camera includes a tri-axial acceleration sensor. The CPU determines a direction of the camera at a time of image capturing, on the basis of a gravitational direction which is detected by the tri-axial acceleration sensor, calculates a parameter for projection-correcting a captured image in a predetermined direction on the basis of the direction of the camera, and corrects a distortion of the captured image by using the parameter.

18 Claims, 9 Drawing Sheets

FIG.9A
O-Q-S PLANE

FIG.9B
O-P-S PLANE

IMAGE-CAPTURING APPARATUS, METHOD, AND PROGRAM WHICH CORRECT DISTORTION OF A CAPTURED IMAGE BASED ON AN ANGLE FORMED BETWEEN A DIRECTION OF AN IMAGE-CAPTURING APPARATUS AND A GRAVITATIONAL DIRECTION

CROSS-REFERENCE TO RELATED APPLICATIONS

This application is based upon and claims the benefit of priority from prior Japanese Patent Application No. 2005-226708, filed Aug. 4, 2005, the entire contents of which are incorporated herein by reference.

BACKGROUND OF THE INVENTION

1. Field of the Invention

The present invention relates generally to an image-capturing apparatus such as a digital camera, and more particularly to an image-capturing apparatus having a function of correcting a captured image which is distorted due to an inclination of a camera with respect to a photographic subject, and to an image correction method and a program for use in the image-capturing apparatus.

2. Description of the Related Art

With an increasing popularity of digital cameras in these years, it is considered that the digital camera is used not only to simply photograph scenes and persons, but also to capture images of documents, such as paper sheets or personal cards, or images on a whiteboard or the like, and to digitally save and manage the captured images in personal computers, etc.

In the case where a document, a whiteboard, etc. is a photographic subject, it is possible that the subject is photographed in an oblique direction because of the position of the photographer, illumination light, etc. In such a case, keystone distortion (trapezoidal distortion) may occur in a captured image in accordance with the inclination of the camera, and characters, etc. on the image may become illegible.

A conventional method of correcting such image distortion is disclosed, for example, in Patent Document 1 (Jpn. Pat. Appln. KOKAI Publication No. 2005-115711). In Patent Document 1, contour information of a photographic subject is extracted, and distortion of a captured image is corrected on the basis of the contour information. Thereby, even in the case where an image is captured by a camera that is inclined, it is possible to obtain a rectangular image as if it were captured by a camera that is set in a frontal direction.

In the method of Patent Document 1, however, the following problem will arise. That is, since the contour information of the subject is used, correction cannot be made unless the contour information is correctly extracted. In this case, there is a possible method in which the user designates the contour part of the image on the screen. However, this is very time-consuming and a great load is imposed on the user.

BRIEF SUMMARY OF THE INVENTION

The present invention has been made in consideration of the above-described problem, and the object of the invention is to provide an image-capturing apparatus, an image correction method and a program, which can easily correct distortion of an image which is captured in an inclined direction, without a need for contour information.

According to an aspect of the present invention, there is provided an image-capturing apparatus comprising: an image capture which acquires an image of a photographic subject; a gravity detector which detects a gravitational direction; direction determiner which determines a direction of a camera at a time of image capturing, on the basis of the gravitational direction which is detected by the gravity detector; a parameter calculator which calculates a parameter for projection-correcting a captured image, which is acquired by the image capture, in a predetermined direction, on the basis of the direction of the camera which is determined by the direction determiner; and image corrector which corrects a distortion of the captured image by using the parameter which is calculated by the parameter calculator.

DETAILED DESCRIPTION OF THE INVENTION

An embodiment of the present invention will now be described with reference to the accompanying drawings.

(1) Structure of Apparatus

Figure 1:
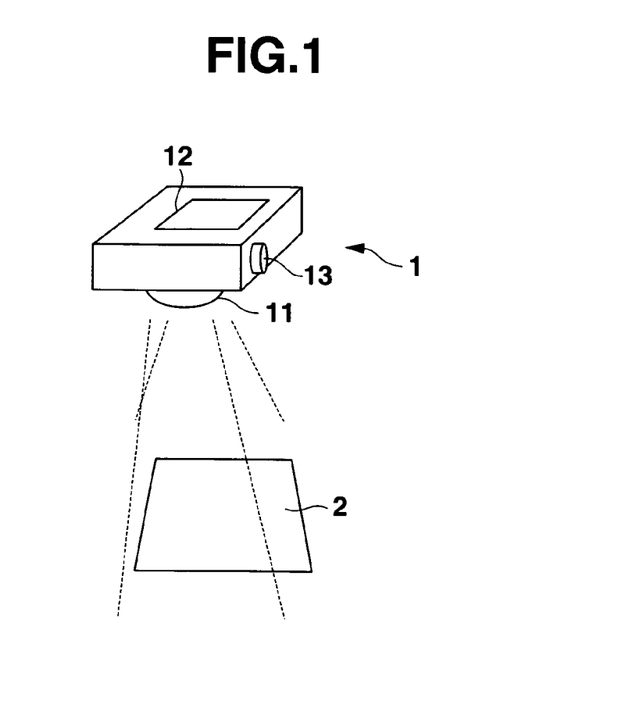
FIG. 1 shows a state of photographing in a case where a digital camera is used as an example of an image-capturing apparatus according to an embodiment of the present invention, the digital camera being situated such that a lens thereof is vertically (downward) positioned.
Figure 2:
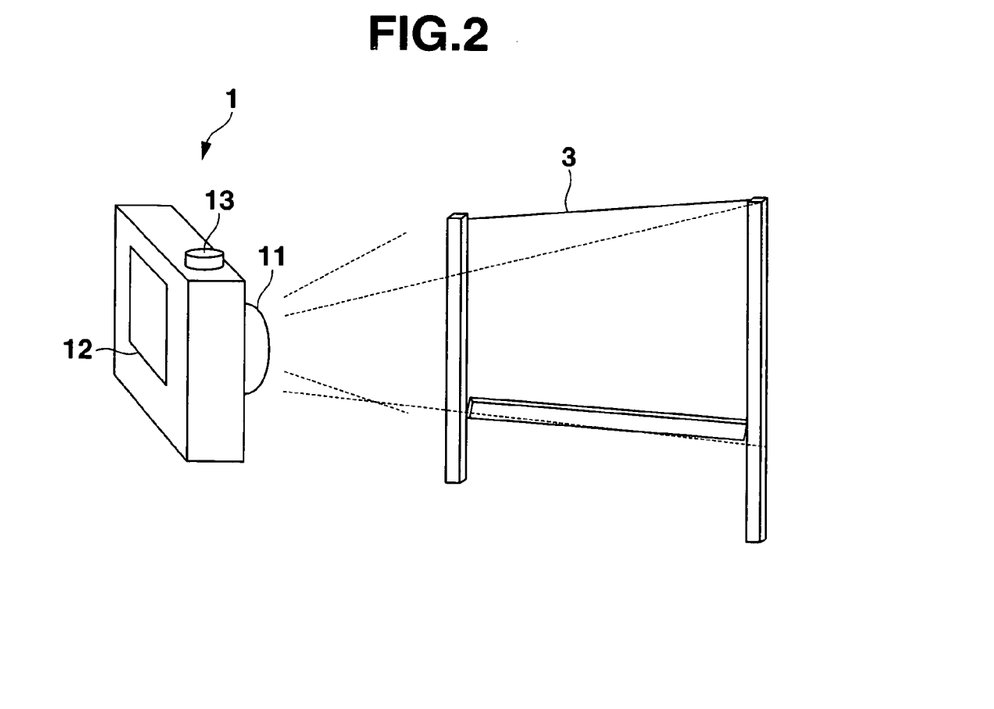
FIG. 2 shows a state of photographing in a case where a digital camera is used as an example of an image-capturing apparatus according to an embodiment of the present invention, the digital camera being situated such that a lens thereof is horizontally positioned.

FIG. 1 and FIG. 2 show states of photographing in cases where a digital camera is used as an example of an image-capturing apparatus according to an embodiment of the present invention. In FIG. 1, the lens of the camera is vertically (downward) positioned. In FIG. 2, the lens of the camera is horizontally positioned.

In the description below, terms "up-and-down direction" and "right-and-left direction" are used. On the other hand, as regards the coordinate system of the real world, terms "vertical" and "horizontal" are used.

Photographic subjects of a digital camera 1 according to the embodiment include a paper sheet 2 which is placed horizontal on, e.g. a desk, characters written on a whiteboard 3 which is vertically set on the floor, and a paper sheet which is attached on the whiteboard 3. The digital camera 1 has a function of correcting a keystone distortion of an image of a subject even when the image of the subject is captured in an inclined direction other than the frontal direction, thereby generating an image as if it were captured in the frontal direction.

As shown in FIG. 1 and FIG. 2, the digital camera 1 includes an optical lens unit 11, a liquid crystal monitor 12 and a shutter key 13.

The optical lens unit 11 includes a lens for collecting light, and collects light from a photographic subject. The liquid crystal monitor 12 displays an image that is captured via the optical lens unit 11. The shutter key 13 is an operation button for designating an image-capturing timing.

Figure 3:
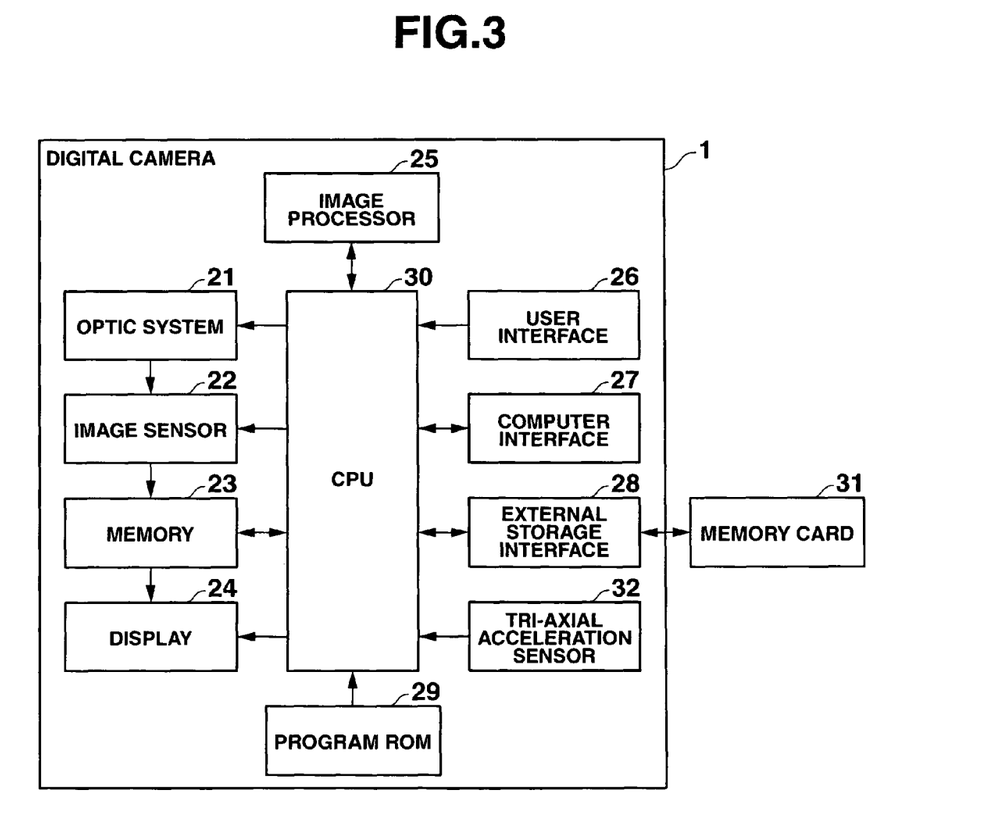
FIG. 3 is a block diagram showing a circuit configuration of the digital camera in the embodiment.

FIG. 3 is a block diagram showing a circuit configuration of the digital camera 1 according to the embodiment.

The digital camera 1 comprises an optic system 21, an image sensor 22, a memory 23, a display 24, an image processor 25, a user interface 26, a computer interface 27, an external storage interface 28, a program ROM 29, a CPU 30, a memory card 31, and a tri-axial acceleration sensor 32.

The optic system 21 is composed of the optical lens unit 11 and a driving unit for the optical lens unit 11. The optic system 21 converges light from the photographic subject on the image sensor 22, and focuses an image on the image sensor 22.

The image sensor 22 captures the image of the subject, which is focused by the optic system 21, as digitized image data. For example, the image sensor 22 is composed of a CCD (Charge-Coupled Device). The image sensor 22 is controlled by the CPU 30. Unless the shutter key 13 is pressed, the image sensor 22 generates image data with low resolution for preview, and periodically sends the image data to the memory 23 at an interval of about 30 frames per second. If the shutter key 13 is pressed, the image sensor 22 generates image data with high resolution, and sends the generated image data to the memory 23. The image-capturing sensitivity (ISO (International Organization for Standardization) sensitivity) of the image sensor 22 can be set by the CPU 30. The ISO sensitivity can be adjusted in accordance with the brightness of the photographic subject.

The memory 23 temporarily stores a preview image with low resolution or image data with high resolution from the image sensor 22, original image data that is processed by the image processor 25, and image data that is processed. The memory 23 delivers the temporarily stored image data to the display 24 or image processor 25. The memory 23 is provided with a parameter memory area for storing a projection correction parameter, which will be described later.

The display 24 includes the liquid crystal monitor 12, and displays an image on the liquid crystal monitor 12. The display 24 displays, on the liquid crystal monitor 12, a preview image with low resolution or an image with high resolution, which is temporarily stored in the memory 23.

Figure 4:
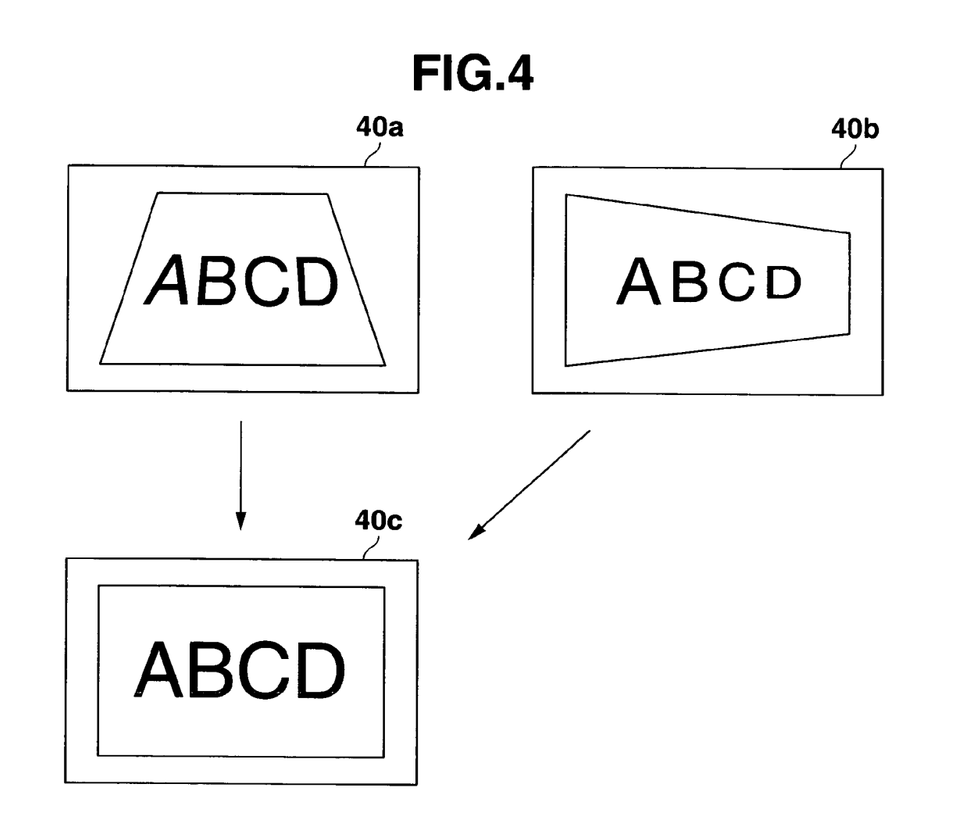
FIG. 4 is a view for explaining image correction of the digital camera in the embodiment.

The image processor 25 subjects the image data, which is temporarily stored in the memory 23, to image processing such as compression of image data. In the embodiment, the image processor 25 performs a process for correcting a distorted image, which is distorted in a trapezoidal shape ("keystone distortion") as shown by reference numeral 40a and 40b in FIG. 4, to an image as shown by reference numeral 40c in FIG. 4.

Figure 5:
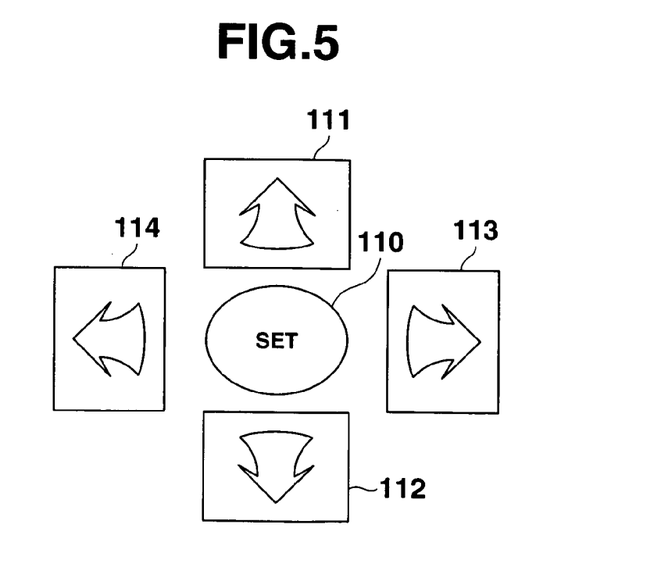
FIG. 5 shows an arrangement of a SET key and upward, downward, rightward and leftward cursor keys which are provided on a user interface of the digital camera in the embodiment.

The user interface 26 comprises, in addition to the shutter key 13, a power key, a photographing key and a reproduction key, which are not shown. Signals, which are generated by operating these keys, are sent directly to the CPU 30. The user interface 26, as shown in FIG. 5, includes a SET key 110 and upward, downward, rightward and leftward cursor keys 111 to 114. The keys 110 and 111 to 114 are used as operation keys for fine adjustment of projection correction, as will be described later.

The computer interface 27 operates as a USB storage class driver when the digital camera 1 is connected to a computer (not shown). Thereby, when the computer is connected to the digital camera 1, the computer handles the memory card 31 as an external storage device of the computer.

The external storage interface 28 executes input/output of image data from/to the memory card 31.

The memory card 31 stores image data, etc. which are delivered from the external storage interface 28.

The program ROM 29 stores a program that is executed by the CPU 30. The program ROM 29 is composed of a ROM, a flash memory, etc.

The CPU 30 controls the entire system according to the program that is stored in the program ROM 29. The memory 23 is also used as a working memory of the CPU 30.

If the switch key of the user interface 26 is pressed and operation information is sent from the user interface 26, the CPU 30 controls, on the basis of the operation information, the image sensor 22, memory 23, display 24 and image processor 25.

Specifically, if operation information that is indicative of a press of the photographing key is sent from the user interface 26, the CPU 30 sets the respective parts in the photography mode. If the shutter key 13 is not pressed in the state in which the respective parts are set in the photography mode, the CPU 30 sets the image sensor 22 in the preview mode. On the other hand, if the shutter key 13 is pressed in this state, the CPU 30 sets the image sensor 22 in the high-resolution mode for capturing an image of a photographic subject with high resolution. In addition, if operation information that is indicative of a press of the reproduction key is sent, the CPU 30 sets the respective parts in the reproduction mode.

The CPU 30 records the preview image and high-resolution image data in the memory card 31 via the external storage interface 28, or reads out the recoded image data from the memory card 31. The CPU 30 records image data, which is compressed with, e.g. a JPEG format, in the memory card 31.

When the CPU 30 temporarily stores the image data in the memory 23, the CPU 30 records the preview image and high-resolution image data in different memory areas. In addition, the CPU 30 records the image data in the memory card 31 by dividing the image data into image files.

The CPU 30 records the preview image and high-resolution image data in the memory card 31 via the external storage interface 28, or reads out the recoded image data from the memory card 31. For this purpose, the CPU 30 creates image files for storing the image data in the memory card 31.

The tri-axial acceleration sensor 32 is provided in the casing of the digital camera 1 in order to detect the direction of gravity (gravitational direction). The tri-axial acceleration sensor 32 can read out acceleration components of the tri-axial directions from the CPU 30. Thereby, the CPU 30 can determine the relative relationship between the photographing direction of the digital camera 1 and the gravitational direction. In recent years, various types of tri-axial acceleration sensors have been put to practical use. An example of the tri-axial acceleration sensor is one using a piezoresistance element.

Next, image correction, which is realized by the digital camera 1 having the above-described structure, is described in detail.

(2) Direction of Camera and Projection Correction Control

Figure 6:
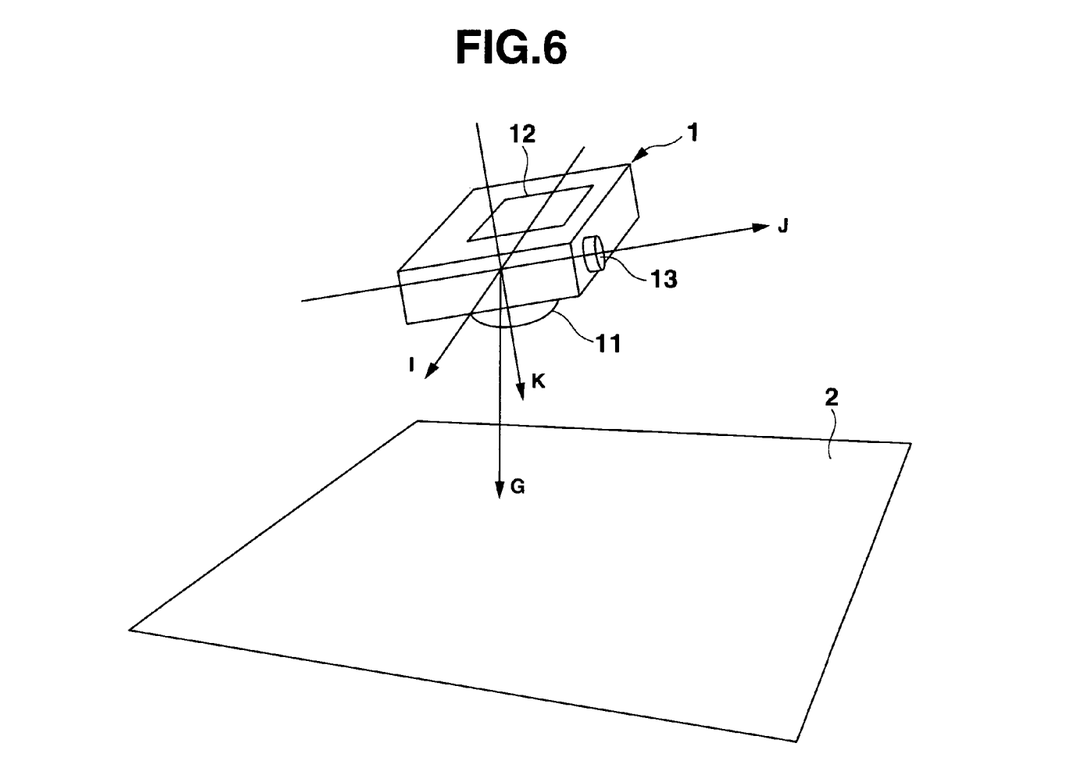
FIG. 6 illustrates a relationship between the digital camera according to the embodiment and a photographic subject which is horizontally situated.

The digital camera 1 is equipped with the tri-axial acceleration sensor 32. The tri-axial directions, which are detected by the tri-axial acceleration sensor 32, can arbitrarily be geometrically corrected. For the purpose of convenience, a coordinate system of an I axis, J axis and K axis, as shown in FIG. 6, is considered. The I axis is a horizontal direction of the CCD, the J axis is a vertical direction of the CCD, and the K axis is the optical-axis direction.

As is shown in FIG. 6, when a paper sheet 2 that is horizontally placed on a desk, etc. is a photographic subject, the optical axis (K axis) of the digital camera 1 is set in the gravitational direction (G). When photographing is performed in this direction, the digital camera 1 executes projection correction, assuming that the photographic subject is placed on the horizontal plane.

Figure 7:
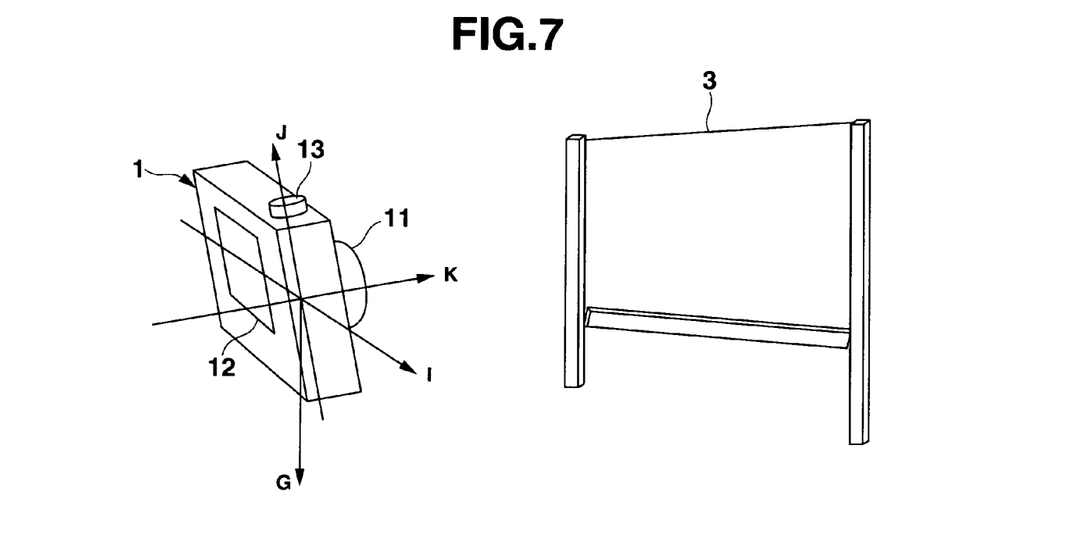
FIG. 7 illustrates a relationship between the digital camera according to the embodiment and a photographic subject which is vertically situated.

On the other hand, as shown in FIG. 7, when a whiteboard 3 that is vertically set on a floor surface, etc. is a photographic subject, the optical axis (K axis) of the digital camera 1 is horizontally positioned. When photographing is performed in this direction, the digital camera 1 executes projection correction, assuming that the photographic subject is vertically placed.

A method of switching the above-described two projection correction modes will now be explained.

Assume that tri-axial components, which are read out of the tri-axial acceleration sensor 32, are expressed as (i, j, k). When the digital camera 1 faces downward, the optical axis (K axis) is situated toward the gravitational direction (G). Thus, as shown in formula 1, the method of detecting the direction of the camera makes use of the fact that the component k is greater than the sum of vectors of the other components.

$$\begin{cases} \text{when } |k| \geq \sqrt{i^2 + j^2}, & \text{the camera is vertically positioned} \\ \text{when } |k| < \sqrt{i^2 + j^2}, & \text{the camera is horizontally positioned} \end{cases} \quad (1)$$

In another method, since the magnitude of gravity is understood in advance, the direction of the camera can also be detected by determining whether the component k is greater than $|G|/2$ ($|G|$=the magnitude of gravity), as shown in formula 2.

$$\begin{cases} \text{when } |k| \geq |G|/2, & \text{the camera is vertically positioned} \\ \text{when } |k| < |G|/2, & \text{the camera is horizontally positioned} \end{cases} \quad (2)$$

(3) Projection Correction in Case where the Camera Faces Downward

When the digital camera 1 faces downward, projection correction is executed by assuming that the photographic subject is horizontally placed. The "projection correction," in this context, refers to image distortion correction (keystone correction) using projection transform. The projection correction is performed independently in the J-axis direction and K-axis direction. To begin with, the projection correction on the J-axis direction is explained.

Figure 8:
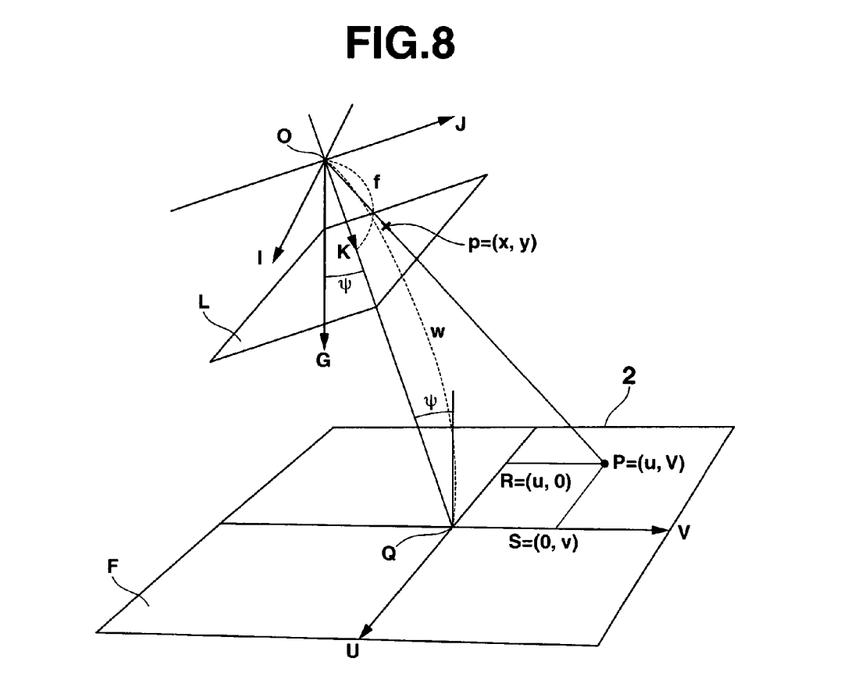
FIG. 8 is a view for explaining projection correction in a case where the digital camera according to the embodiment is vertically positioned.

FIG. 8 shows an example in which the digital camera 1 is inclined with respect to the gravitational direction in a J-K plane. In FIG. 8, point O designates the center position of the digital camera 1. Symbol G designates a gravitational vector that is detected by the tri-axial acceleration sensor 32. In this case, since the digital camera 1 is not inclined to the I-axis direction, the I component of G is 0.

Symbol ψ is an angle between the gravitational vector G and the K axis. That is, ψ is an angle of inclination of the photographic subject with respect to the vertical direction. By contrast, symbol φ, which will be described later, is an angle of inclination of the subject with respect to the horizontal direction. For the purpose of convenience, the G direction is set at 0°, and an angle of the J axis to the positive side is defined as a +direction. Thus, the angle ψ in FIG. 8 is a negative angle.

Figure 9A:
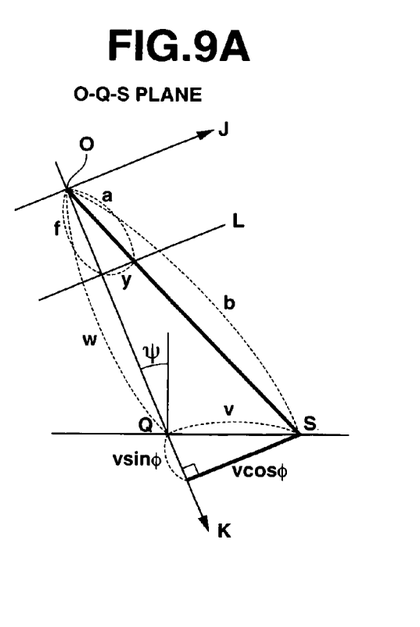
FIGS. 9A and 9B show an O-Q-P plane and an O-P-S plane, which are extracted from FIG. 8.
Figure 9B:
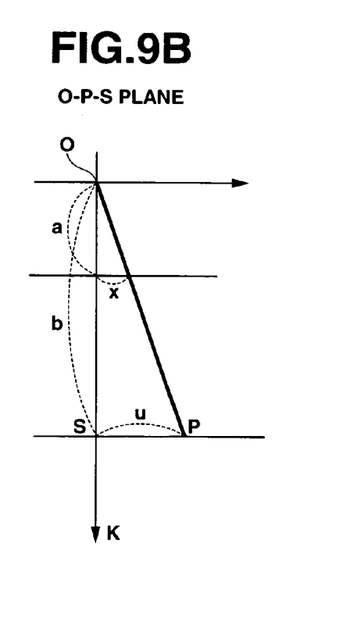

A line of intersection between a plane, which is defined by the K axis and J axis, and a plane F of the paper sheet is a V axis. A line of intersection between a plane, which is defined by the I axis and K axis, and the plane F is a U axis. A point of intersection between the V axis, U axis and the optical axis (K axis) of the digital camera is Q, and Q is set to be the origin (0, 0). The coordinates of a given point P on the U-V plane is (u, v). A point, which is obtained by perpendicularly drawing the point P to the U axis, is R=(u, 0), and a point, which is obtained by perpendicularly drawing the point P to the V axis, is R=(0, v). FIG. 9A shows an O-Q-S plane, and FIG. 9B shows an O-P-S plane.

In the Figures, f is a focal distance of the digital camera 1. An image, which is captured by the digital camera 1, can be considered such that an image L is projected on a virtual screen that is positioned at the distance f from the center point O of the digital camera 1 on the optical axis (K axis). Assume that the coordinate system of the image L is X-Y, the X-axis and the I-axis extend in the same direction, and the Y-axis and the J-axis extend in the same direction. In the example of FIG. 8, the point P on the image F is projected on coordinates p (x, y).

In this case, the following relationship is established.

$$x = \frac{u}{\alpha - v/f \sin\phi} \quad (3)$$

$$y = \frac{v \cos\phi}{\alpha - v/f \sin\phi}$$

In the above equations, α=w/f, and α indicates the relationship in scale between the coordinate system (X-Y) of the image L and the coordinate system (U-V) of the sheet surface. In the correction process, the coordinates of the output image are set to be equal to the coordinates of the input image, and thus the scale α is treated as 1.

In order to simplify the description of transform, expressions are made on the basis of the homogeneous coordinate system. The coordinates (u, v) of the point P on the U-V plane are expressed by the following formula 4. Symbol H represents a projection correction parameter (transform matrix).

$$\begin{bmatrix} x' \\ y' \\ z' \end{bmatrix} = H \begin{bmatrix} u \\ v \\ 1 \end{bmatrix} \quad (4)$$

$$\text{where } H = \begin{bmatrix} a_{11} & a_{12} & a_{13} \\ a_{21} & a_{22} & a_{23} \\ a_{31} & a_{32} & a_{33} \end{bmatrix}$$

The final coordinates (u, v) are calculated by the following formula 5.

$$x = \frac{x'}{z'} = \frac{a_{11}u + a_{12}v + a_{13}}{a_{31}u + a_{32}v + a_{33}} \quad (5)$$

$$y = \frac{y'}{z'} = \frac{a_{21}u + a_{22}v + a_{23}}{a_{31}u + a_{32}v + a_{33}}$$

In the homogeneous coordinate system, above-described formula 3 is expressed by the following formula 6, where α in formula 3=1.

$$\begin{bmatrix} x' \\ y' \\ z' \end{bmatrix} = H_{py} \begin{bmatrix} u \\ v \\ 1 \end{bmatrix} \quad (6)$$

$$\text{where } H_{py} = \begin{bmatrix} 1 & 0 & 0 \\ 0 & 1/\cos\phi & 0 \\ 0 & \tan\phi/f & 1 \end{bmatrix}$$

In formula 6, Hpy is a projection correction parameter in the up-and-down direction of the image.

Similarly, in the case where the optical axis (K axis) of the digital camera 1 is inclined by φ with respect to the gravitational direction G only on the I-K plane, the following relationship is established.

$$\begin{bmatrix} x' \\ y' \\ z' \end{bmatrix} = H_{py} \begin{bmatrix} u \\ v \\ 1 \end{bmatrix} \quad (7)$$

$$\text{where } H_{px} = \begin{bmatrix} 1/\cos\phi & 0 & 0 \\ 0 & 1 & 0 \\ \tan\phi/f & 0 & 1 \end{bmatrix}$$

In formula 7, Hpx is a projection correction parameter in the right-and-left direction of the image.

Next, assume that the optical axis of the digital camera 1 is inclined by φ on the I-K axis plane with respect to the gravitational direction, and by ψ on the J-K axis plane with respect to the gravitational direction. In this case, a relationship of synthesis of formulae 6 and 7 is established.

$$H = H_{px} \cdot H_{py} = \begin{bmatrix} 1/\cos\phi & 0 & 0 \\ 0 & 1 & 0 \\ \tan\phi/f & 0 & 1 \end{bmatrix} \begin{bmatrix} 1 & 0 & 0 \\ 0 & 1/\cos\phi & 0 \\ 0 & \tan\phi/f & 1 \end{bmatrix} \quad (8)$$

In formula 8, φ and ψ can be found from the following relationship when the components of the gravitational vector G are (i, j, k).

$$\phi = \tan^{-1}(i/k)$$

$$\text{where } -\pi/2 < \phi < \pi/2$$

$$\psi = \tan^{-1}(j/k)$$

$$\text{where } -\pi/2 < \psi < \pi/2 \quad (9)$$

In actual projection correction, to begin with, φ and ψ are found from the components (i, j, k) of the detected gravitational vector G according to formula 9. Then, based on the values of φ and ψ, the value of H=Hpx·Hpy in formula 8 is found.

Subsequently, by substituting the value of H and the coordinates (u, v) of the corrected image in the formula 4, the corresponding coordinates (x, y) of the original image with projection distortion are obtained. In this case, since the solutions to (x, y) are not limited to integers, the pixel value P (u, v) of the output image, which is the corrected image, are found from neighboring pixels of the coordinates (x, y) of the input image, which is the original image, by the following formula 10 by using bi-linear interpolation. The bi-linear interpolation is one of image interpolation methods, and the pixel value of coordinates is found from neighboring four pixel values of the coordinates.

$$P(u,v) = (1-kx)^*(1-ky)^*p(X,Y) + kx^*(1-ky)^*p(X+1,Y) + (1-kx)^*ky^*p(X,Y+1) + kx^*ky^*p(X+1,Y+1)$$

where, with the coordinates of point p of one image being p(x, y)

kx: the value after the decimal point of x ky: the value after the decimal point of y X: integer part (x)

Y: integer part (y) (10)

The above procedure is executed for all coordinate points in the output range. Thereby, an image which is captured in an oblique direction can be corrected to an image which is captured in a frontal direction.

(4) Fine Adjustment of Projection Correction

By the method described in the above section (3), the captured image of the paper sheet 2 that is horizontally placed on the desk, or the like, can satisfactorily be projection-corrected. However, in this case, it is presupposed that the paper sheet 2, or the photographic subject, is horizontally placed. For example, if the desk is disposed with an inclination, projection correction may not exactly be performed.

In such a case, the user may operate the four upward/downward/rightward/leftward cursor keys 111 to 114 shown in FIG. 5, while viewing the corrected image displayed on the liquid crystal monitor 12 of the digital camera 1. Thereby, the projection angles φ and ψ are increased/decreased, and the shape of the image can arbitrarily be adjusted.

(5) Projection Correction in Case where Camera is Horizontally Situated

Assume now that, as shown in FIG. 7, characters written on the whiteboard 3 or a paper sheet attached to the whiteboard 3 is photographed by the digital camera 1 that is horizontally situated.

Figure 10:
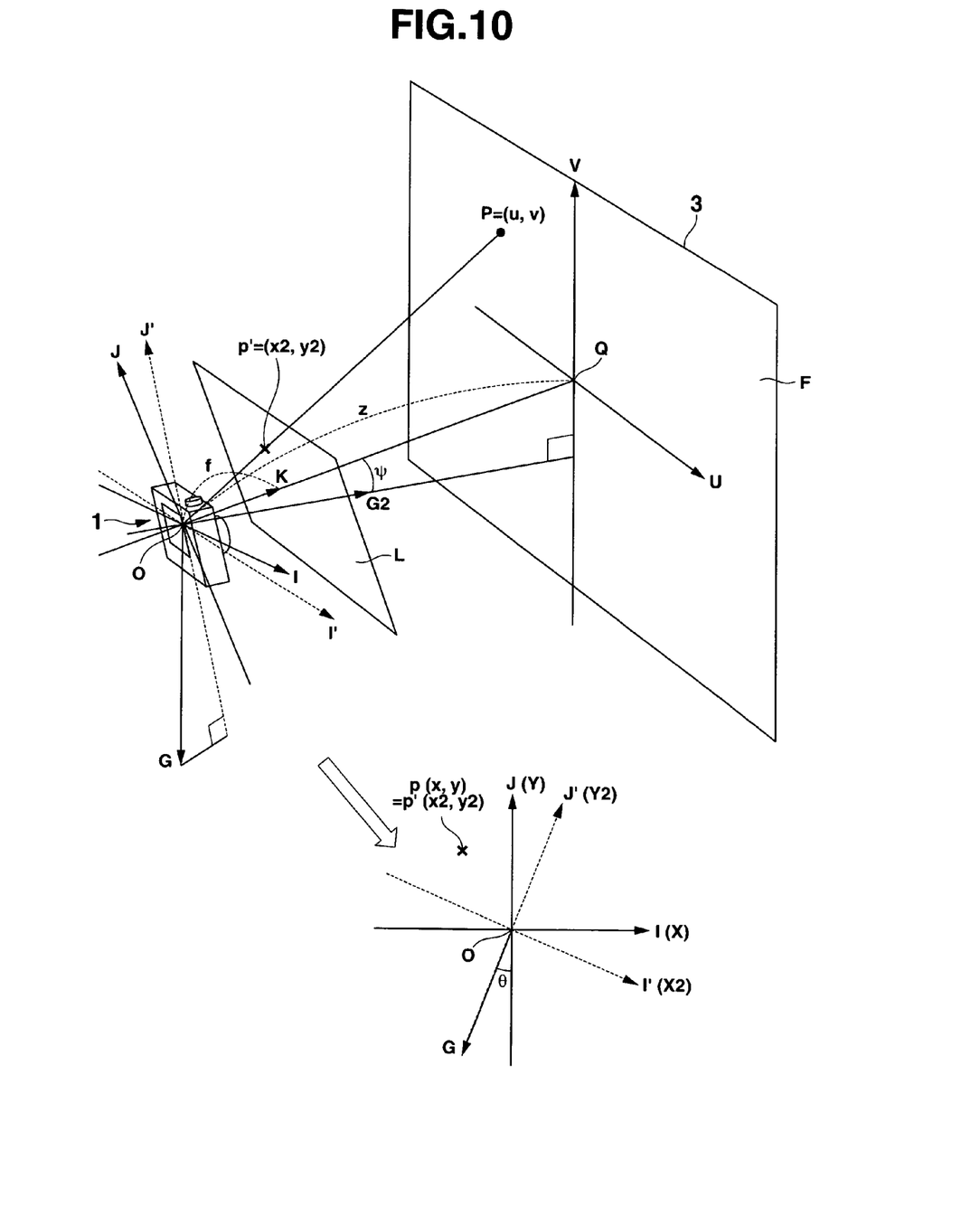
FIG. 10 is a view for explaining projection correction in a case where the digital camera according to the embodiment is horizontally positioned.

In this case, as shown in FIG. 10, the gravitational vector G of the digital camera 1 is parallel to the V axis of the plane F of the whiteboard 3 that is the photographic subject. Although the angle between the V axis of the plane F and the optical axis K of the digital camera 1 can be found, the angle between the U axis of the plane F and the optical axis K of the digital camera 1 cannot be specified.

Thus, when the digital camera 1 is horizontally positioned, the captured image is subjected to only projection correction in the vertical direction. In other words, only distortion of the image due to non-uniformity in vertical length is corrected. In this case, distortion in the horizontal direction is left. In general, right-and-left adjustment can easily be performed if the photographer alters his/her position facing the photographic subject to the right or left. Thus, there arises no particular problem.

If the fine adjustment function as described in the above section (4) is used, the distortion in the horizontal direction can also be corrected manually by operating the rightward and leftward cursor keys 113 and 114.

When the digital camera 1 is horizontally situated as shown in FIG. 10, it is necessary to perform projection correction in the gravitational direction by determining the gravitational direction. For this purpose, an auxiliary I'-J'-K coordinate space is considered.

The J' axis is an axis that is obtained by perpendicularly projecting the G axis on the I-J plane. The direction of the J' axis is opposite to the direction of the G axis. The I' axis is an axis that is rotated by −90°, relative to the J' axis, about the origin O of the digital camera 1 on the I-J plane. The K axis is common to both coordinate systems. If both the optical axis K of the digital camera 1 and the longitudinal direction of the camera 1 are perpendicular to the gravitational direction G, the I-J-K space matches with the I'-J'-K space.

The U-V coordinates on the whiteboard plane are defined as coordinates that are obtained by projecting the I'-J' plane in the K-axis direction.

Like the above-described case (3), assume that an image L is projected on a virtual screen that is positioned at a distance f from the center point O of the digital camera 1 on the optical axis (K axis), the coordinate system of the image L is X2-Y2 of the I'-J' coordinate system, and the X2 axis and I' axis extend in the same direction and the Y2 axis and J' axis extend in the same direction. In the example of FIG. 10, the point P (u, v) on the image F is projected on coordinates p' (x2, y2).

In this case, if the coordinates of the point p' on the X-Y coordinate system are (x, y), the relationship between (x, y) and (x2, y2) is given by the following formula 11.

$$\begin{bmatrix} x \\ y \\ 1 \end{bmatrix} = H_R \begin{bmatrix} x2 \\ y2 \\ 1 \end{bmatrix} \quad (11)$$

$$\text{where } H_R = \begin{bmatrix} \cos\theta & \sin\theta & 0 \\ -\sin\theta & \cos\theta & 0 \\ 0 & 0 & 1 \end{bmatrix}$$

In formula 11, $H_R$ is a rotational correction parameter for correcting the vertical direction and the up-and-down direction of the image, and designates coordinate transform of the X-Y coordinate system and X'-Y' coordinate system. The angle between these coordinate systems is equal to the angle θ between the I-J coordinates and I'-J' coordinates. Since the angle θ is, from the definition, an angle between the rotational axis (J axis) of the digital camera 1 and the gravitational vector G, the angle θ can be expressed by the following formula 12.

$$\theta = \tan^{-1}(i/j)$$

$$\text{where } -\pi/2 < \theta < \pi/2 \quad (12)$$

The inclination of the whiteboard 3 is corrected only on the V-axis direction. It may be considered that the projection correction is performed along the J' axis, and coordinate rotation is performed from the J' axis to the J axis. The projection transform formula in this case is given by the following formula 13.

$$H = H_R \cdot H_{py} = \begin{bmatrix} \cos\theta & \sin\theta & 0 \\ -\sin\theta & \cos\theta & 0 \\ 0 & 0 & 1 \end{bmatrix} \begin{bmatrix} 1 & 0 & 0 \\ 0 & \cos\phi & 0 \\ 0 & -\sin\phi/f & 1 \end{bmatrix} \quad (13)$$

In formula 13, ψ is the angle between the optical axis K and the plane of the photographic subject. Since it is assumed that the subject is parallel to the gravitational direction G, ψ becomes the angle between the K axis and the horizontal vector G2 in the J'-K plane. Thus, when the components of the gravity G are (i, j, k), ψ is expressed by the following formula 14.

$$\psi = \tan^{-1}(k/\sqrt{i^2+j^2})$$

$$\text{where } -\pi/2 < \psi < \pi/2 \quad (14)$$

By finding ψ and θ from formulae 12 and 14 and substituting the value of ψ and θ in formula 13, the projection correction parameter H is found. By substituting the projection correction parameter H in formula 4, the projection correction in the vertical direction can be performed.

(6) Projection Correction in Case where Camera is Horizontally Situated and Horizontal Line is Found In the method described in the above section (5), the projection distortion in the vertical direction of the digital camera 1 is corrected, but the projection distortion in the horizontal direction is not corrected. The reason is that the tri-axial acceleration sensor 32 is not capable of specifying an inclination of the photographic subject in the horizontal plane with respect to the optical axis of the camera.

To cope with this, there is proposed a method in which a horizontal straight line is found from the photographic subject, the inclination of the subject in the horizontal plane is estimated from the straight line, and thus projection correction is executed.

Figure 11:
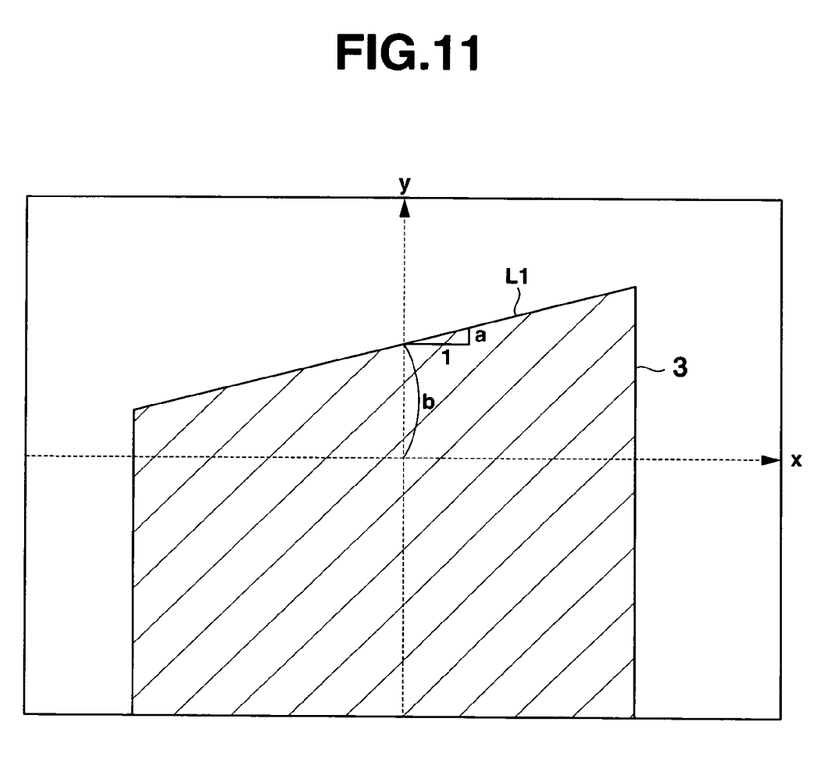
FIG. 11 shows an image of a part of a whiteboard that is vertically set, which is captured by the digital camera according to the embodiment.

FIG. 11 shows a captured image of a part of the whiteboard 3 that is vertically set. In FIG. 11, a part indicated by hatching is the whiteboard. In this example, an upper side straight line L1 of the whiteboard 3 is photographed, but a lower part of the whiteboard 3 does not fall within the angle of view and is missing. In this example, it is assumed that no projection distortion occurs in the vertical direction.

The straight line L1 in FIG. 11 can be detected by executing an edge process and Hough transform. The Hough transform is one of methods of extracting a line segment. The straight line detection method using the Hough transform will be described later in detailed with reference to FIG. 13.

Assume now that the detected straight line L1 is expressed by the following formula 15.

$$y = ax + b \quad (15)$$

In the case where the whiteboard 3 is inclined to the U axis (transverse direction), the relationship of formula 7 is established. The corresponding coordinates (u, v) of the point (x, y) on the straight line L1 are always fixed coordinates. From these facts and formula 15, the relationship of the following formula 16 is given.

$$\phi = \tan^{-1}\frac{af}{b} \quad (16)$$

Thus, if there is no projection distortion in the vertical direction, correction can be made by the following formula 17.

$$\begin{bmatrix} x' \\ y' \\ z' \end{bmatrix} = H_{py} \begin{bmatrix} u \\ v \\ 1 \end{bmatrix} \quad (17)$$

$$\text{where } H_{px} = \begin{bmatrix} \cos\phi & 0 & 0 \\ 0 & 1 & 0 \\ -\sin\phi/f & 0 & 1 \end{bmatrix}$$

From the above, the captured image may be projection-corrected in the following procedure.

To start with, an image which is projection-corrected in the vertical direction is obtained by the method of the above-described section (5).

Next, using the corrected image as an input image once again, projection correction in the horizontal direction is performed. For this purpose, an edge image, which indicates the contour of the corrected image, is created, and the edge image is subjected to Hough transform. Thereby, a formula of a straight line which is close to a horizontal line is calculated.

Subsequently, the inclination φ of the photographic subject is found by the formula 16 from the parameters a and b of the calculated straight line. By substituting the inclination φ in the formula 17, the final transform formula is obtained.

In a case where a plurality of straight lines are detected, it is desirable to find φ from the respective straight lines, and to perform projection correction by estimating the mean value of φ as the inclination of the subject in the horizontal direction.

(7) Improved Straight Line Detection Method

In the method of the above-described section (6), after the projection correction in the vertical direction is made, the straight line has to be detected, and this leads to an increase in processing time.

Thus, a straight line in the right-and-left direction is detected from the original image which is not subjected to the projection correction in the vertical direction. Assume that the straight line at this time is given by the following formula 18.

$$y = a'x + b' \quad (18)$$

The formula of the straight line of the U-V coordinates in the case where the straight line is corrected in the vertical direction of gravity by the formula 13 is as follows.

$$v = \frac{(a_{23}a_{32} - a_{22}a_{23})a' +}{\Delta}$$
$$\frac{(a_{22}a_{31} - a_{21}a_{32})b' + (a_{23}a_{31} - a_{21}a_{33})}{\Delta}u +$$
$$\frac{(a_{22}a_{32} - a_{22}a_{33})a' +}{(a_{21}a_{12} - a_{11}a_{22})b' + (a_{21}a_{13} - a_{11}a_{23})}$$
$$\Delta$$

$$\Delta = (a_{33}a_{12} - a_{32}a_{13})a' + (a_{11}a_{31} - a_{12}a_{31})b' + (a_{33}a_{11} - a_{31}a_{13})$$

where $a_{ij}$ is each element of $$H = H_R \cdot H_{py} \quad (19)$$

$$= \begin{bmatrix} a_{11} & a_{12} & a_{13} \\ a_{21} & a_{22} & a_{23} \\ a_{31} & a_{32} & a_{33} \end{bmatrix} \quad (20)$$

This straight line is a straight line that is distorted in the horizontal direction, i.e. the transverse direction. This straight line is further subjected to distortion correction. Specifically, by transforming the variable (u, v) in formula 19 to (x, y) and executing comparison with formula 15, it is understood, from formula 16, that the horizontal distortion angle φ can be found by the following formula 21.

$$\phi = \tan^{-1} \frac{(a_{23}a_{32} - a_{22}a_{23})a' +}{(a_{22}a_{31} - a_{21}a_{32})b' + (a_{23}a_{31} - a_{21}a_{33})} f \quad (21)$$
$$\frac{(a_{22}a_{13} - a_{23}a_{12})a' +}{(a_{21}a_{12} - a_{11}a_{22})b' + (a_{21}a_{13} - a_{11}a_{23})}$$

Therefore, the synthetic projection correction parameter H is given by the following formula 22.

$$H = H_R \cdot H_{py} \cdot H_{px} \quad (22)$$

$$= \begin{bmatrix} \cos\theta & \sin\theta & 0 \\ -\sin\theta & \cos\theta & 0 \\ 0 & 0 & 1 \end{bmatrix} \begin{bmatrix} 1 & 0 & 0 \\ 0 & \cos\psi & 0 \\ 0 & -\sin\psi/f & 1 \end{bmatrix} \begin{bmatrix} \cos\phi & 0 & 0 \\ 0 & 1 & 0 \\ -\sin\phi/f & 0 & 1 \end{bmatrix}$$

From the above, the captured image may be projection-corrected in the following procedure.

To begin with, ψ and θ are found from the input image according to the formula 12 and formula 14, and H=$H_R$·Hpy is found.

Then, an edge image is created, and a straight line close to the horizontal direction is detected from the edge image by Hough transform. From the parameter of the straight line, φ is found by the formula 21 and H=$H_R$·Hpy·Hpx is found as a final projection correction parameter. Thereby, using the formula 4, the projection correction can be performed by bi-linear interpolation.

(8) Description of Actual Operation

The operation of the digital camera 1, which realizes the above-described projection correction corresponding to the direction of the camera, will now be described. The process in the flow chart to be described below is executed by the procedure that is described in the program which is read by the CPU 30, or the microcomputer, from the program ROM 29.

Figure 12:
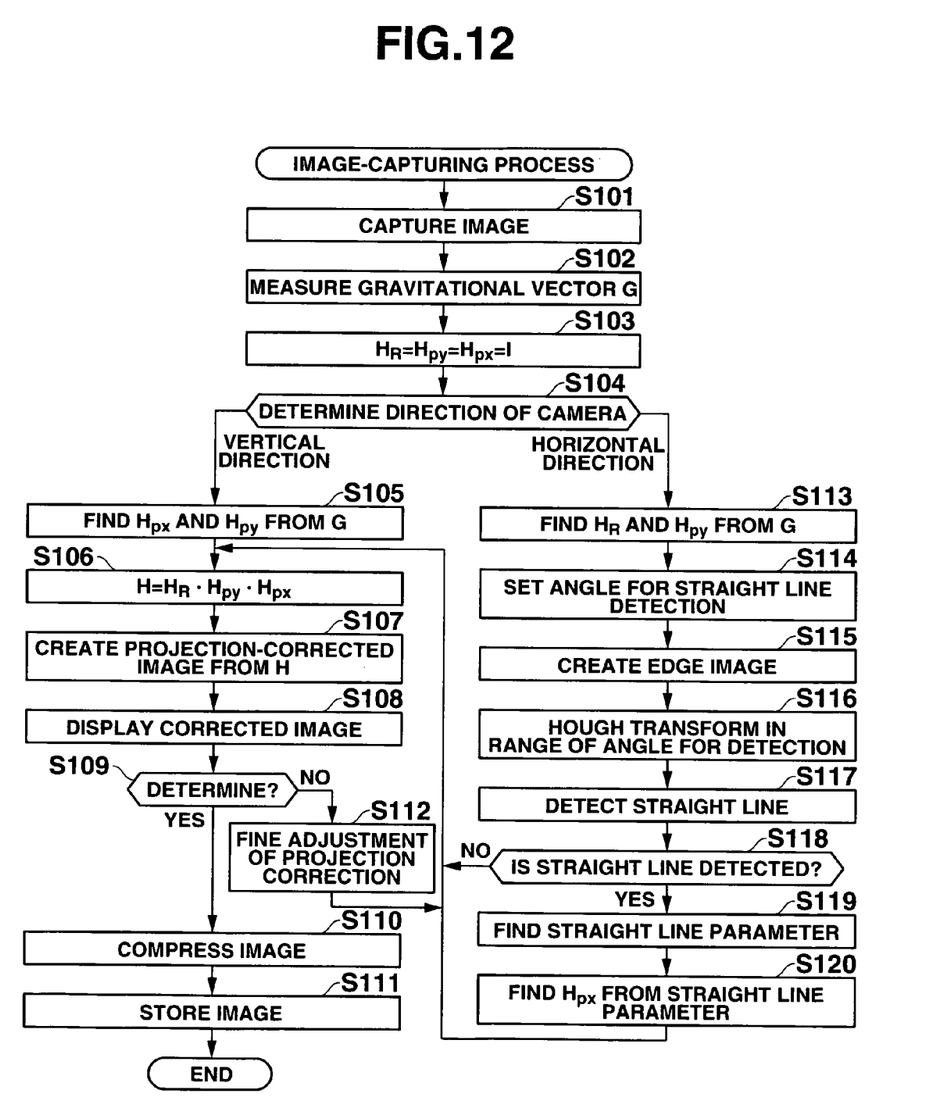
FIG. 12 is a flow chart illustrating the operation of the image-capturing process of the digital camera according to the embodiment.

FIG. 12 is a flow chart illustrating the operation of the image-capturing process of the digital camera 1. This process is executed by the CPU 30 with use of the image processor 25. The process procedures which are executed by the CPU 30 will be described in order.

To start with, when the shutter key 13 is pressed, the CPU 30 controls the optic system 21 and image sensor 22, and executes the image-capturing process. An image which is captured by the image sensor 22 is stored in the memory 23 (step 101).

Next, in order to determine the direction of the digital camera 1, the CPU 30 reads out the components of the I axis, J axis and K axis from the tri-axial acceleration sensor 32. In this case, in normal photographing, since this process is executed in the state in which the digital camera 1 is in the still position, it can be assumed that the acceleration component (i, j, k) is only the gravitational component G. Thus, G=(i, j, k) (step S102). The direction of the digital camera 1, in this context, refers to the direction of the optical lens unit 11, that is, the direction of the optical axis K.

The three components of Hpx, Hpy and $H_R$, which are projection correction parameters, are initialized to a unit matrix I (step S103). Hpx is a projection correction parameter in the horizontal direction of the digital camera 1 or in the right-and-left direction of the image, and Hpy is a projection correction parameter in the vertical direction of the digital camera 1 or in the up-and-down direction of the image. $H_R$ is a rotational correction parameter for correcting the vertical direction and the up-and-down direction of the image of the digital camera 1.

Next, the CPU 30 determines the direction of the digital camera 1 according to formula 1 or formula 2 (step S104). As a result, if it is determined that the digital camera 1 is vertically positioned, the CPU 30 finds $\phi$ and $\psi$ from the gravitational component G according to formula 9, and substitutes the $\phi$ and $\psi$ for the elements of the matrices Hpx and Hpy of the formulae 6 and 7, thereby finding the projection correction parameter Hpx in the right-and-left direction of the image and the projection correction parameter Hpy in the up-and-down direction of the image (step S105). The projection correction parameter Hpx in the right-and-left direction of the image and the projection correction parameter Hpy in the up-and-down direction of the image are stored in the parameter storage areas in the memory 23.

Next, the CPU 30 finds $H = H_R \cdot Hpy \cdot Hpx$ (step S106). At this time, since the $H_R$ is initialized to the unit matrix I, the projection correction parameter H is the same value as in the formula 8. Thus, by using the projection correction parameter H, the projection distortion of the photographic subject placed on the horizontal plane can be corrected.

If the projection correction parameter H is obtained, the CPU 30 delivers the projection correction parameter H to the image processor 25 and instructs creation of a projection-corrected image. Then, the image processor 25 projection-corrects the captured image, thereby creating a rectangular image as if it were captured in the frontal direction (step S107).

Specifically, using the projection correction parameter H that is obtained in step S106, the coordinates (u, v) of the corrected image are successively substituted in the transform equations of formula 5. Thereby, the coordinates (x, y) of the original image with projection distortion, which corresponds to the corrected image, are found. Then, according to the formula 10, the pixel values P (u, v) of the corrected image are found by the bi-linear method from the neighboring pixels of the coordinates (x, y).

The CPU 30 copies the projection-corrected image to the display area of the memory 23, and then displays the image on the liquid crystal monitor 12 (step S108). Thereby, the user is enabled to confirm the corrected image on the screen and to finely adjust the image as needed.

After the corrected image is displayed, the CPU 30 determines whether the SET key 110, which is provided on the user interface 26, is pressed (step S109). If the SET key 110 is pressed (Yes in step S109), the CPU 30 causes the image processor 25 to compress the corrected image by a predetermined scheme (step S110), and transfers and stores the compressed image in the memory card 31 via the external storage interface 28 (step S111).

Next, a fine adjustment process of the corrected image is described.

If the SET key 110 is not pressed in step S109, the CPU 30 executes a fine adjustment process of the corrected image in accordance with the operation of the cursor keys 111 to 114 which are provided on the user interface 26 (step S112). The fine adjustment process is a process for finely adjusting the inclinations $\phi$ and $\psi$ of the photographic subject, which are automatically detected from the captured image. As shown in FIG. 5, the cursor keys 111 to 114 are operation keys for designating the upward, downward, rightward and leftward directions.

If the CPU 30 detects that the rightward cursor key 113 or leftward cursor key 114 is pressed, the CPU 30 finely adjusts the projection distortion correction on the U-axis direction. Specifically, the CPU 30 executes correction of $+1°$ for the automatically detected $\phi$ when the rightward cursor key 113 is pressed, and executes correction of $-1°$ for the automatically detected $\phi$ when the leftward cursor key 114 is pressed, thereby correcting the transform matrix of the projection correction parameter Hpx in the right-and-left direction of the image.

Similarly, the CPU 30 executes correction of $+1°$ for the automatically detected $\psi$ when the upward cursor key 111 is pressed, and executes correction of $-1°$ for the automatically detected $\psi$ when the downward cursor key 112 is pressed, thereby finely adjusting the projection distortion correction on the V-axis direction and correcting the transform matrix of the projection correction parameter Hpy in the up-and-down direction of the image.

If Hpx and Hpy are corrected by the fine adjustment, the CPU 30 returns to step S106 and recalculates H of the synthetic transform formula. Since the projection-corrected image is redisplayed by using the corrected H, the user can finely adjust the projection correction while confirming the corrected image. If the corrected image is satisfactory for the user, the user presses the SET key 110. Thereby, the final corrected image is compressed and stored in the memory card 31.

Next, a description is given of the correction procedure in the case where the direction of the camera is horizontal.

If it is determined in step S104 that the direction of the digital camera 1 is horizontal, the control process goes to step S113.

If the digital camera 1 is horizontally positioned, the CPU 30 finds the angles $\psi$ and $\theta$ from the components of the gravitational vector G by using the formulae 12 and 14, and finds the projection correction parameters Hpy and $H_R$ from the obtained values (step S113).

Figure 14:
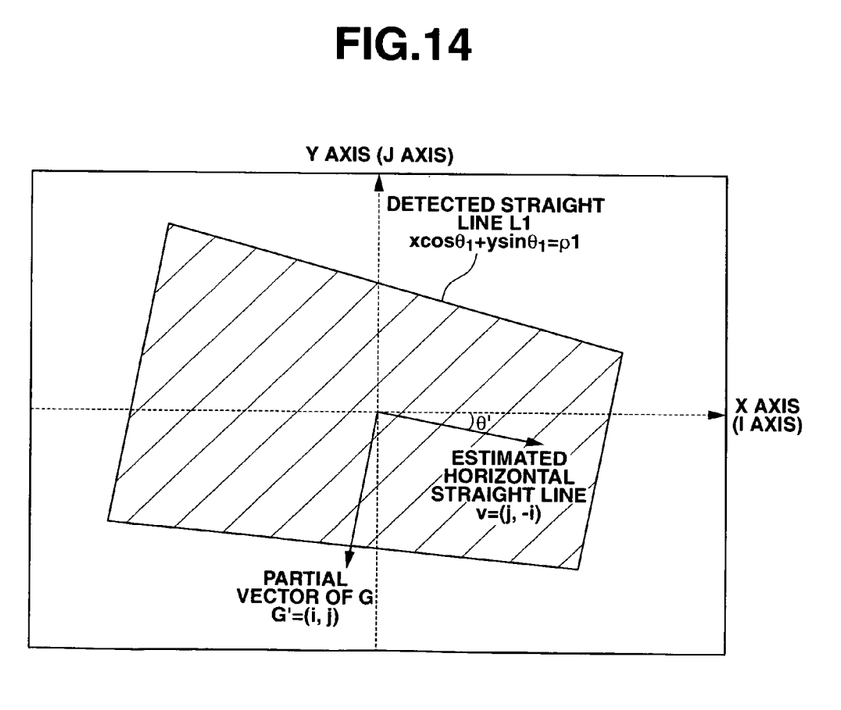
FIG. 14 is a view for explaining a method of detecting a horizontal straight line from a captured image.

Next, the method of detecting a horizontal straight line from a captured image is described by referring to an example of a captured image shown in FIG. 14. A hatched part of the captured image indicates that a whiteboard, which is a photographic subject, is photographed in the state in which the whiteboard is slightly inclined. FIG. 14 shows an X axis and a Y axis of the captured image. These axes agree with the directions of the coordinate system I, J of the camera.

Assuming the gravitational vector G=(i, j, k), a partial vector G'=(i, j) of the I and J components of the G vector, which is laid over the captured image, is shown. The direction of this vector is the gravitational direction of the captured image. If the detected horizontal line is equidistant with respect to the depth direction (K-axis direction) and there is no projection distortion, the detected horizontal line becomes the direction of the vector v=(−j, i) which is at right angles with the vector G'. An angle $\theta'$ between the vector v and I axis is an angle of $\tan^{-1}(-i/j)$, as shown in FIG. 14. However, the angle of a horizontal straight line, which is to be actually detected, varies due to projection distortion with respect to the angle $\theta'$. An angle $\theta 1$ of the straight line L1 in FIG. 14, which is an example of the horizontal straight line on the whiteboard, is an angle close to $\theta'$ and is affected by distortion. Thus, a parallel line can be detected by detecting a straight line with an angle close to $\theta'$.

Normally, it is estimated that an angle varying due to projection distortion falls within a range of about ±30°. Thus, the CPU 30 sets the detection range of the straight line at ($\theta'-30°$ to $\theta'+30°$) with respect to $\theta'$ (step S114).

Next, the CPU 30 traces the contour of the input image and creates an edge image (step S115). Then, the CPU 30 executes Hough transform on the basis of the edge image, thereby detecting a straight line. The detection range at this time is the range that is set in step S114. Based on the number of votes relating to (ρ, θ) which is obtained by the Hough transform in the detection range, the straight line is detected (step S117).

Figure 13:
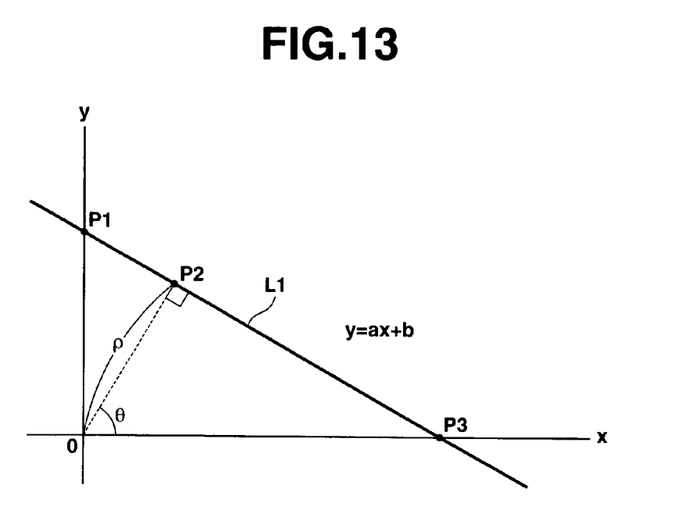
FIG. 13 is a view for explaining Hough transform of the digital camera according to the embodiment.

The Hough transform is explained below.

There is known a method called "Hough transform" as one of methods for extracting a line segment. For example, consider a straight line, y=ax+b, on an x-y coordinate system, as shown in FIG. 13. A perpendicular line is drawn to this straight line from the origin O. If the length of the perpendicular line is ρ, and the angle between the perpendicular line and the x axis is θ, the following equation is given.

ρ=x cos θ+y sin θ.

In other words, on a polar coordinate system, if one point (ρ, θ) is specified, one straight line is determined. The (ρ, θ) is called the Hough transform of the straight line y=ax+b. The number of pixels on the line segment, which is represented by (ρ, θ), is called "number of votes". As the number of votes increases, a longer straight line is indicated.

The CPU 30 compares the maximum value of the number of votes of (ρ, θ) with a preset threshold value. If the maximum value of the number of votes is greater than the threshold value, it is determined that a straight line in a horizontal direction is detected (Yes in step S118). On the other hand, if the maximum value of the number of votes is less than the threshold value, it is determined that a straight line in a horizontal direction is not detected (No in step S118).

If a straight line in a horizontal direction is not detected, the control process goes to step S106 and the synthetic transform H is found. In this case, since Hpx is not found and remains the unit matrix I, the H at this time is equal to the formula 13. Thus, in step S107, the captured image in the case where the whiteboard 3, for instance, is the photographic subject is projection-corrected only with respect to the vertical direction relative to the gravity.

On the other hand, if the straight line is detected in step S118, the CPU 30 finds straight-line parameters a' and b' of the formula 18 from (ρ, θ) of the maximum value of the number of votes (step S119).

Subsequently, the CPU 30 finds the synthetic H=$H_R$·Hpy, and finds the angle φ of the distortion in the horizontal direction from the elements of H and the straight-line parameters a' and b' by using the formula 21. Thereafter, according to the formula 7, the projection correction parameter Hpx in the horizontal direction is found (step S120).

As described above, when the straight line in the horizontal direction is detected, the projection correction parameter Hpx in the horizontal direction can be calculated on the basis of the straight line. Subsequently, in step S106, the synthetic transform H is found using the Hpx and the previously obtained $H_R$ and Hpy. The H is equal to the formula 22. Thus, in step S107, the captured image in the case where the whiteboard 3, for instance, is the photographic subject is projection-corrected with respect to not only the vertical direction relative to the gravity, but also the horizontal direction.

In the case where the digital camera 1 is horizontally positioned to capture an image, like the case in which the digital camera 1 is vertically situated, the projection-corrected image can finely be adjusted (steps S108 to S112). Therefore, even if the whiteboard 3, for instance, is set with a slight inclination, it is possible to finely adjust the corrected image by a manual operation and to store the adjusted image.

As has been described above, according to the present embodiment, the direction of the digital camera 1, relative to the photographic subject that is horizontally or vertically situated, is determined on the basis of the gravitational direction that is detected by the tri-axial acceleration sensor 32. Based on the determined direction of the digital camera 1, the method of projection correction is switched. Thereby, the distortion of the captured image can exactly be corrected without the need for contour information.

In the case of the photographic subject, such as whiteboard 3, which is vertically disposed on the floor surface or the like, a distortion in the right-and-left direction of the image cannot be projection-corrected on the basis of only the detection of gravity by the tri-axial acceleration sensor 32. However, by detecting at least one of straight lines in the horizontal direction from the captured image, the right-and-left direction of the image can be specified on the basis of the detected straight line and the projection correction can be performed.

In addition, while confirming the projection-corrected image on the monitor screen, the user can finely adjust the corrected image by operating the upward, downward, rightward and leftward cursor keys. Thereby, the user can store the captured image after shaping the image as desired by the user.

In the present embodiment, the still image is captured by the digital camera by way of example. The present invention, however, is applicable to not only the case of capturing the still image, but also the case of capturing motion video.

The present invention is applicable not only to digital cameras, but also to various kinds of electronic devices with image-capturing functions, such as camera-equipped mobile phones.

The present invention is not limited directly to the embodiment described above, and its components may be embodied in modified forms without departing from the spirit of the invention. Further, various inventions may be made by suitably combining a plurality of components described in connection with the foregoing embodiment. For example, some of the components according to the foregoing embodiment may be omitted. Furthermore, components according to different embodiments may be combined as required.

The method that is described in connection with the present embodiment may be constructed as a program that can be executed by a computer. The program may be stored in a recording medium such as a magnetic disk (e.g. a flexible disk, a hard disk), an optical disk (e.g. a CD-ROM, a DVD-ROM) or a semiconductor memory, and may be applied to various apparatuses. The program itself may be transmitted via transmission media such as networks, and may be applied to various apparatuses. The computer, which realizes the present apparatus, reads the program that is stored in the recording medium or the program that is provided via the transmission media, and the operation of the apparatus is controlled by the program. Thereby, the apparatus executes the above-described process.

What is claimed is:

1. An image-capturing apparatus comprising:
   an image capture unit which captures an image of a photographic subject;
   a gravity detector which detects a gravitational direction;
   a direction determiner which determines whether a direction of an optical axis of the image-capturing apparatus is (i) in a substantially vertical state in which the optical axis of the image-capturing apparatus substantially corresponds to the gravitational direction, or (ii) in a substantially horizontal state in which the optical axis of the image-capturing apparatus is substantially perpendicular to the gravitational direction;

a parameter calculator which calculates (i) a first parameter for projection-correcting the captured image with respect to two axes, based on an angle formed between the direction of the optical axis of the image-capturing apparatus and the gravitational direction, when the direction determiner determines that the direction of the image-capturing apparatus is substantially vertical, and (ii) a second parameter for projection-correcting the captured image with respect to only one axis, based on an angle formed between the direction of the optical axis of the image-capturing apparatus and the gravitational direction, when the direction determiner determines that the direction of the image-capturing apparatus is substantially horizontal; and an image corrector which corrects a keystone distortion of the captured image by using the first parameter or the second parameter which is calculated by the parameter calculator.

2. The image-capturing apparatus according to claim 1, further comprising:

a straight line detector which detects a straight line in a horizontal direction from the captured image which is acquired by the image capture unit;

wherein the parameter calculator calculates the second parameter to projection-correct the captured image with respect to the vertical direction based on the angle formed between the direction of the optical axis of the image-capturing apparatus and the gravitational direction and to projection-correct the captured image with respect to the horizontal direction based on the straight line which is detected by the straight line detector.

3. The image-capturing apparatus according to claim 1, further comprising:

a memory which stores the first parameter which is calculated by the parameter calculator;

a display which displays an image which is corrected by the image corrector;

an alteration instructor which instructs alteration of the first parameter which is stored in the memory; and a controller which alters the first parameter in accordance with an alteration instruction by the alteration instructor, and which redisplays a corrected image, which is obtained using the altered first parameter, on the display.

4. The image-capturing apparatus according to claim 3, wherein the alteration instructor instructs alteration of the first parameter, which is stored in the memory, in accordance with an operation of upward, downward, rightward and leftward cursor keys.

5. An image correction method, performed in an image-capturing apparatus, comprising:

capturing an image of a photographic subject;

detecting a gravitational direction;

determining whether a direction of an optical axis of the image-capturing apparatus is (i) in a substantially vertical state in which the optical axis of the image-capturing apparatus substantially corresponds to the gravitational direction, or (ii) in a substantially horizontal state in which the optical axis of the image-capturing apparatus is substantially perpendicular to the gravitational direction;

calculating (i) a first parameter for projection-correcting the captured image with respect to two axes, based on an angle formed between the direction of the optical axis of the image-capturing apparatus and the gravitational direction, when it is determined that the direction of the image-capturing apparatus is substantially vertical, and (ii) a second parameter for projection-correcting the captured image with respect to only one axis, based on an angle formed between the direction of the optical axis of the image-capturing apparatus and the gravitational direction, when it is determined that the direction of the image-capturing apparatus is substantially horizontal; and correcting a keystone distortion of the captured image by using the calculated first parameter or second parameter.

6. The image correction method according to claim 5, further comprising:

detecting a straight line in a horizontal direction from the captured image;

wherein the second parameter is calculated to projection-correct the captured image with respect to a vertical direction based on the angle formed between the direction of the optical axis of the image-capturing apparatus and the gravitational direction and to projection-correct the captured image with respect to the horizontal direction based on the straight line in the horizontal direction.

7. The image correction method according to claim 5, further comprising:

storing the first parameter in a memory;

displaying the captured image, of which the distortion has been corrected by using the first parameter, on a screen; and altering the first parameter stored in the memory in accordance with an alteration instruction, and redisplaying a corrected image, which is corrected using the altered first parameter, on the screen.

8. The image correction method according to claim 7, wherein the alteration instruction instructs alteration of the first parameter, which is stored in the memory, in accordance with an operation of upward, downward, rightward and leftward cursor keys.

9. A non-transitory computer readable recording medium having a program stored thereon that is executable by a computer to control the computer to perform functions comprising:

capturing an image of a photographic subject;

detecting a gravitational direction;

determining whether a direction of an optical axis of the image-capturing apparatus is (i) in a substantially vertical state in which the optical axis of the image-capturing apparatus substantially corresponds to the gravitational direction, or (ii) in a substantially horizontal state in which the optical axis of the image-capturing apparatus is substantially perpendicular to the gravitational direction;

calculating (i) a first parameter for projection-correcting the captured image with respect to two axes, based on an angle formed between the direction of the optical axis of the image-capturing apparatus and the gravitational direction, when it is determined that the direction of the image-capturing apparatus is substantially vertical, and (ii) a second parameter for projection-correcting the captured image with respect to only one axis, based on an angle formed between the direction of the optical axis of the image-capturing apparatus and the gravitational direction, when it is determined that the direction of the image-capturing apparatus is substantially horizontal; and correcting a keystone distortion of the captured image by using the calculated first parameter or second parameter.

10. The computer readable recording medium according to claim 9, wherein the functions further comprise:

detecting a straight line in a horizontal direction from the captured image;

wherein the second parameter is calculated to projection-correct the captured image with respect to the vertical direction based on the angle formed between the direction of the optical axis of the image-capturing apparatus and the gravitational direction and to projection-correct the captured image with respect to the horizontal direction based on the straight line in the horizontal direction.

11. The computer readable recording medium according to claim 9, wherein the functions further comprise:
storing the first parameter in a memory;
displaying the captured image, of which the distortion has been corrected by using the first parameter, on a screen; and
altering the first parameter stored in the memory in accordance with an alteration instruction, and redisplaying a corrected image, which is obtained using the first altered parameter, on the screen.

12. The computer readable recording medium according to claim 11, wherein the alteration instruction instructs alteration of the first parameter, which is stored in the memory, in accordance with an operation of upward, downward, rightward and leftward cursor keys.

13. The image-capturing apparatus according to claim 1, wherein the direction determiner determines that the direction of the image-capturing apparatus is substantially vertical when the angle formed between the gravitational direction and the direction of the optical axis of the image-capturing apparatus is less than a threshold value.

14. The image-capturing apparatus according to claim 1, wherein the direction determiner determines that the direction of the image-capturing apparatus is substantially horizontal when the angle formed between the gravitational direction and the direction of the optical axis of the image-capturing apparatus is more than a threshold value.

15. The image correction method according to claim 5, wherein it is determined that the direction of the image-capturing apparatus is substantially vertical when the angle formed between the gravitational direction and the direction of the optical axis of the image-capturing apparatus is less than a threshold value.

16. The image correction method according to claim 5, wherein it is determined that the direction of the image-capturing apparatus is substantially horizontal when the angle formed between the gravitational direction and the direction of the optical axis of the image-capturing apparatus is more than a threshold value.

17. The computer readable recording medium according to claim 9, wherein it is determined that the direction of the image-capturing apparatus is substantially vertical when the angle formed between the gravitational direction and the direction of the optical axis of the image-capturing apparatus is less than a threshold value.

18. The computer readable recording medium according to claim 9, wherein it is determined that the direction of the image-capturing apparatus is substantially horizontal when the angle formed between the gravitational direction and the direction of the optical axis of the image-capturing apparatus is more than a threshold value.

* * * * *